(12) United States Patent
Li et al.

(10) Patent No.: US 11,243,431 B2
(45) Date of Patent: Feb. 8, 2022

(54) BACKLIGHT MODULE, METHOD FOR ASSEMBLING THE SAME, AND DISPLAY PANEL

(71) Applicants: Beijing BOE Optoelectronics Technology Co., Ltd., Beijing (CN); BOE Technology Group Co., Ltd., Beijing (CN)

(72) Inventors: Wenyang Li, Beijing (CN); Zeyuan Tong, Beijing (CN); Rui Han, Beijing (CN); Qing Ma, Beijing (CN); Donglong Lin, Beijing (CN); Dong Cui, Beijing (CN); Bin Long, Beijing (CN); Fujian Ren, Beijing (CN); Peng Wu, Beijing (CN); Zhipeng Zhang, Beijing (CN); Daekeun Yoon, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 495 days.

(21) Appl. No.: 16/327,781

(22) PCT Filed: Jul. 10, 2018

(86) PCT No.: PCT/CN2018/095113
§ 371 (c)(1),
(2) Date: Feb. 22, 2019

(87) PCT Pub. No.: WO2019/056832
PCT Pub. Date: Mar. 28, 2019

(65) Prior Publication Data
US 2021/0349349 A1  Nov. 11, 2021

(30) Foreign Application Priority Data

Sep. 19, 2017 (CN) .................. 201710851532.X (51) Int. Cl.
*G02F 1/13357* (2006.01)
*G02F 1/1333* (2006.01)

(52) U.S. Cl.
CPC .. *G02F 1/133608* (2013.01); *G02F 1/133314* (2021.01); *G02F 1/133325* (2021.01); *G02F 1/133603* (2013.01)

(58) Field of Classification Search
CPC ......... G02F 1/133608; G02F 1/133603; G02F 1/133314; G02F 1/133325
See application file for complete search history.

(56) References Cited

U.S. PATENT DOCUMENTS

2006/0092344 A1\* 5/2006 Ura ................ G02F 1/133608
349/58
2010/0085502 A1\* 4/2010 Yen ................ G02F 1/133608
349/58

(Continued)

FOREIGN PATENT DOCUMENTS

CN  103032763 A  4/2013
CN  103998979 A  8/2014

(Continued)

OTHER PUBLICATIONS

International Search Report and English Translation of Box V of the Written Opinion dated Oct. 22, 2018, received for corresponding PCT Application No. PCT/CN2018/095113.

*Primary Examiner* — Evan P Dzierzynski
(74) *Attorney, Agent, or Firm* — Kinney & Lange, P.A.

(57) ABSTRACT

The present disclosure provides a backlight module, a method for assembling the same, and a display panel. The backlight module includes: a back plate; a light bar arranged (Continued)

on the back plate; a light guide plate arranged on the back plate to form a gap between the light guide plate and the light bar; a film structure arranged on a light-exiting surface of the light guide plate opposite to the back plate; and a protruding part disposed in the gap, wherein opposite sides of the protruding part are in contact with at least a portion of the light guide plate and the film structure and at least a portion of the light bar respectively.

19 Claims, 4 Drawing Sheets

(56) References Cited

U.S. PATENT DOCUMENTS

| | | | | |
|---|---|---|---|---|
| 2012/0105762 | A1* | 5/2012 | Que | G02F 1/133608 349/60 |
| 2013/0208210 | A1* | 8/2013 | Yu | G02F 1/133308 349/58 |
| 2014/0375925 | A1 | 12/2014 | Kubo | |
| 2015/0138472 | A1* | 5/2015 | Yu | G02F 1/133608 349/43 |
| 2015/0268410 | A1* | 9/2015 | Yu | G02B 6/0073 349/58 |
| 2015/0277178 | A1* | 10/2015 | Yu | G02B 6/0055 349/58 |
| 2016/0116667 | A1 | 4/2016 | Shiraishi et al. | |
| 2017/0315408 | A1* | 11/2017 | Lee | G02F 1/133611 |
| 2018/0101062 | A1* | 4/2018 | Qiu | G02F 1/133608 |

FOREIGN PATENT DOCUMENTS

| | | |
|---|---|---|
| CN | 203771226 U | 8/2014 |
| CN | 104456426 A | 3/2015 |
| CN | 206178299 U | 5/2017 |
| CN | 107390434 A | 11/2017 |

* cited by examiner

BACKLIGHT MODULE, METHOD FOR ASSEMBLING THE SAME, AND DISPLAY PANEL

CROSS-REFERENCE TO RELATED APPLICATION(S)

This application is the National Phase of the PCT Application No. PCT/CN2018/095113, filed on Jul. 10, 2018, entitled "BACKLIGHT MODULE, METHOD FOR ASSEMBLING THE SAME, AND DISPLAY PANEL", which claims priority to the Chinese Patent Application No. 201710851532.X, filed on Sep. 19, 2017, entitled "BACKLIGHT MODULE, METHOD FOR ASSEMBLING THE SAME, AND DISPLAY PANEL" which are incorporated herein by reference in their entireties.

TECHNICAL FIELD

The present disclosure relates to the field of display technologies, and more particularly, to a backlight module, a method for assembling the same, and a display panel.

BACKGROUND

A liquid crystal display module comprises a liquid crystal screen and a backlight module, wherein the backlight module comprises components such as a back plate, a Light Emitting Diode (LED), a light guide plate, a film material etc. In existing products, due to vibrations at places where the products are used, etc., the film material may be displaced or detached, which results in poor display or display failure.

SUMMARY

According to an aspect of the present disclosure, there is proposed a backlight module. The backlight module comprises: a back plate; a light bar arranged on the back plate; a light guide plate arranged on the back plate to form a gap between the light guide plate and the light bar; a film structure arranged on a light-exiting surface of the light guide plate opposite to the back plate; and a protruding part disposed in the gap, wherein two sides of the protruding part are in contact with at least a portion of the light guide plate and the film structure and with at least a portion of the light bar, respectively.

In one embodiment, the protruding part protrudes from the gap, so that the protruding part has an upper surface higher than that of the film structure.

In one embodiment, the backlight module further comprises: a plastic frame. The plastic frame is arranged above a bezel of the film structure, the protruding part and the light bar. The plastic frame has a recess region formed therein to fit the protruding part.

In one embodiment, the plastic frame is in close contact with the film structure and the light bar.

In one embodiment, the plastic frame is not in contact with at least one of the film structure and the light bar.

In one embodiment, the protruding part and the light guide plate are integrally formed.

In one embodiment, the periphery of the back plate is bent upward to form a bezel. In addition, the light bar is further fixed onto the bezel.

In one embodiment, the backlight module further comprises: a light source. The light source is arranged on the light bar and located in the gap. The light source may be a Light Emitting Diode (LED) light source, an Electro-Luminescence (EL) light source, or a Cold Cathode Fluorescent Lamp (CCFL) light source.

In one embodiment, the surface of the protruding part which is in contact with the light guide plate and the film structure is roughened.

In one embodiment, a micro rib is disposed on a side of the portion of the protruding part higher than the light guide plate and the film structure, which faces the light guide plate.

In one embodiment, the film structure has a rectangle shape.

According to another aspect of the present disclosure, there is proposed a method for assembling a backlight module. The method comprises: arranging a light bar on a back plate; arranging a light guide plate and a protruding part on the back plate, so that a gap is formed between the light guide plate and the light bar, and the protruding part is disposed in the gap; and arranging a film structure on the light guide plate. Here, opposite sides of the protruding part are in contact with at least a portion of the light guide plate and the film structure and at least a portion of the light bar respectively. The protruding part protrudes from the gap, so that the protruding part has an upper surface higher than that of the film structure.

In one embodiment, the method further comprises: arranging a plastic frame above the film structure, the protruding part, and the light bar, so that a recess region in the plastic frame fits the protruding part.

In one embodiment, the protruding part and the light guide plate are integrally formed.

In one embodiment, a periphery of the back plate is bent upward to form a bezel. The step of arranging a light bar on the back plate further comprises: fixing the light bar onto the bezel.

In one embodiment, a light source is arranged on the light bar, and the light source is located in the gap.

According to yet another aspect of the present disclosure, there is proposed a display panel. The display panel comprises the backlight module according to any of the embodiments described above.

According to still another aspect of the present disclosure, there is proposed a method for assembling a backlight module. The method comprises: arranging a light bar on a back plate; arranging a light guide plate and a protruding part on the back plate, so that a gap is formed between the light guide plate and the light bar, and the protruding part is disposed in the gap; and arranging a film structure on a light-exiting surface of the light guide plate opposite to the back plate.

In one embodiment, the method further comprises: arranging a plastic frame above the film structure, the protruding part, and the light bar, so that a recess region in the plastic frame fits the protruding part.

In one embodiment, a light source is arranged on the light bar.

In one embodiment, at least one side of the back plate is bent upward to form a bezel, and the light bar is fixed onto the bezel.

In one embodiment, the protruding part and the light guide plate are integrally formed.

In one embodiment, the protruding part protrudes from the gap, so that the protruding part has an upper surface higher than that of the film structure.

In one embodiment, two sides of the protruding part are in close contact with at least a portion of the light guide plate and the film structure and with at least a portion of the light bar, respectively.

BRIEF DESCRIPTION OF THE DRAWINGS

The above and other purposes, features and advantages of the present disclosure will become more apparent from the following description of the embodiments of the present disclosure with reference to the accompanying drawings, in which.

DETAILED DESCRIPTION

Hereinafter, exemplary embodiments of the present disclosure will be described in detail with reference to the accompanying drawings. Throughout the accompanying drawings, the same elements are denoted by the same or similar reference numerals. In the following description, some specific embodiments are for illustrative purposes only and are not to be construed as limiting the present disclosure, but merely examples of the embodiments of the present disclosure. The conventional structure or construction will be omitted when it may cause confusion with the understanding of the present disclosure. It should be illustrated that shapes and sizes of various components in the figures do not reflect true sizes and proportions, but only illustrate contents of the embodiments of the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination.

It should also be illustrated that those skilled in the art will appreciate that terms "A is connected with B" and "A is connected to B" may be that A is directly connected with B, or A is connected with B via one or more other components. In addition, "connected with" and "connected to" herein may be "physically electrically connected", or may be "electrically coupled with" or "electrically coupled to" etc.

The present disclosure will be described in detail below with reference to the accompanying drawings.

Figure 1:
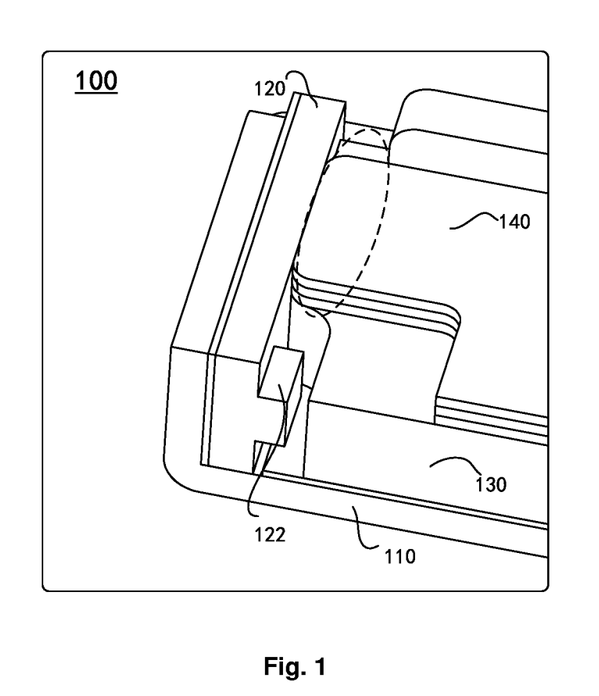
FIG. 1 illustrates an exemplary partial structural view of a backlight module.

FIG. 1 illustrates an exemplary partial structural view of a backlight module 100.

As can be seen from FIG. 1, the backlight module 100 comprises a back plate 110, a light bar 120, a light guide plate 130, and a film structure 140. The light bar 120 and the light guide plate 130 are both mounted on the back plate 110, and the film structure 140 is mounted on the light guide plate 130. The light bar 120, the light guide plate 130, and the film structure 140 may be mounted by, for example, pins, snaps, molten rivets, or gluing etc.

A light source 122 is arranged on the light bar 120. The light source 122 may be formed as an element on the light bar 120 (for example, the light bar 120 may comprise a Printed Circuit Board (PCB) board, and the light source 122 acts as an element on the PCB board, for example, a light emitting diode). Due to the presence of the light source 122, the light guide plate 130 and the film structure 140 abut against the light bar 120 at opposite ends of the light bar 120 by providing the light guide plate 130 and the film structure 140 with protruding portions (shown by broken lines in the figure) (FIG. 1 illustrates only one end since FIG. 1 is a partial view). The film structure 140 has an upper surface substantially flush with that of the light bar 120. In such a structure, since the protruding portions of the light guide plate 130 and the film structure 140 which protrude toward the light bar 120 abut against the light bar 120, the film structure 140 is fixed.

However, in the structure shown in FIG. 1, when a large vibration or stress occurs, for example, when there is a relatively strong vibration in an application scenario such as a vehicle-mounted scenario or an airborne scenario etc., since the portion of the film structure 140 which is in contact with the light bar 120 (through the protruding portions) has a very limited area and the upper surface of the film structure 140 is substantially flush with the upper surface of the light bar 120, it makes the film structure 140 prone to be detached and is thus displaced toward the direction to the light bar 120. This may result in bright lines appearing on the side opposite to the light bar 120, which has a serious impact on the display effect.

Figure 2:
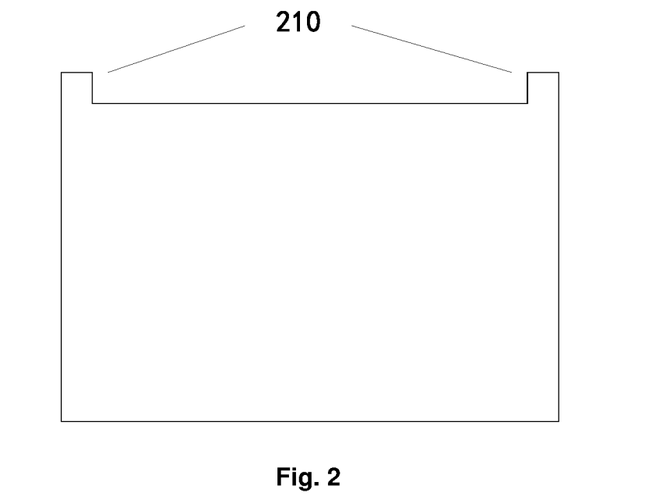
FIG. 2 illustrates an exemplary overall outline view of a film structure in the backlight module shown in FIG. 1.

FIG. 2 illustrates an exemplary overall outline view of the film structure 140 in the backlight module 100 shown in FIG. 1.

As can be seen from FIG. 2, due to the requirements for the structural arrangement in FIG. 1, the film structure 140 has a shape with two protruding portions 210 at opposite ends of the side thereof which is close to the light bar 120. This may cause the film structure to have an irregular shape. This means that there will be relatively complicated cutting operations when the film structure is manufactured, which greatly affects the cutting efficiency of the film structure. In addition, such an irregularly shaped film structure may also cause a waste of the film material, which increases the production cost.

Figure 3:
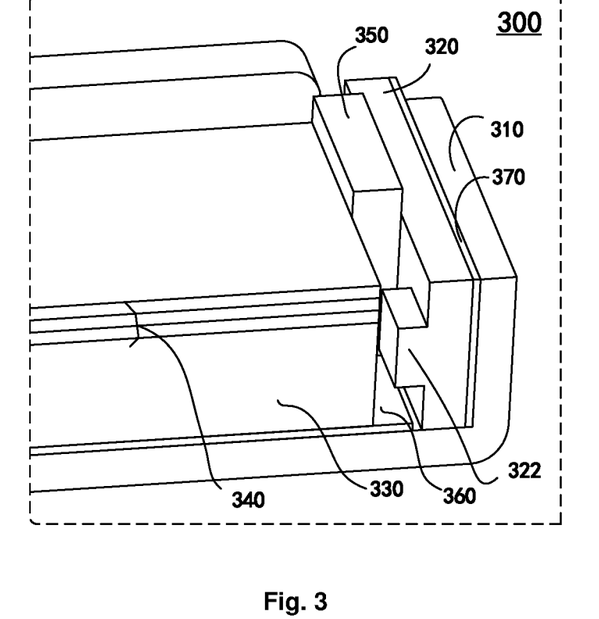
FIG. 3 illustrates an exemplary partial structural view of a backlight module according to an embodiment of the present disclosure.

FIG. 3 illustrates an exemplary partial structural view of a backlight module 300 according to an embodiment of the present disclosure.

As shown in FIG. 3, the backlight module 300 comprises a back plate 310, a light bar 320, a light guide plate 330, a film structure 340, and a protruding part 350. Reflective plates 360 and 370 are also shown in the backlight module 300, but it should be understood by those skilled in the art that this is merely exemplary, and in other embodiments, the reflective plates 360 and 370 may be omitted in the backlight module 300, or other additional structures (such as light shading plates, etc.) may also be added in the backlight module 300 as appropriate.

The back plate 310 may be made of metal, for example, iron, aluminum, or other metal or alloys, or may be made of a non-metal material, for example, plastic. In one embodiment (as exemplarily shown in FIG. 3), the perimeter of the back plate 310 (or at least one side of the back plate 310 on which the light bar is arranged and its opposite side) is bent upward to form a bezel.

The light bar 320 is arranged on the back plate 310. In the example shown in FIG. 3, the reflective plate 360 is further arranged on the back plate 310, and the light guide plate 330 is arranged on the back plate 310 with the reflective plate 360 interposed. In one embodiment, the light bar 320 is fixed onto the bezel formed by bending one side of the back plate 310 as described above.

In one embodiment, as shown in FIG. 3, the reflective plate 370 is further arranged between the light bar 320 and the bezel. In other embodiments, the reflective plate 370 may also be replaced by a light shading plate.

In addition, at least one light source 322 is arranged on the light bar 320. The light source 322 may be a Light Emitting Diode (LED) light source, an Electro-Luminescence (EL) light source, or a Cold Cathode Fluorescent Lamp (CCFL) light source etc.

The light guide plate 330 is also arranged on the back plate 310. The light guide plate 330 is not in contact with the light bar 320, and there is a gap formed therebetween. The light source 322 arranged on the light bar 320 is disposed in the formed gap. Alternatively, the light source 322 is also arranged separately from the light guide plate 330.

The film structure 340 is arranged on a light-exiting surface of the light guide plate 330 opposite to the back plate 310. The film structure 340 may comprise, for example, a brightness enhancement film, a diffusion film, a prism sheet, etc. In one embodiment, the film structure 340 has an edge flush with that of the light guide plate 330.

The protruding part 350 is arranged in the gap formed between the light guide plate 330 and the light bar 320. The protruding part 350 has one side in contact with at least a portion of the light guide plate 330 and the film structure 340 arranged on the light guide plate 330, and the other side in contact with at least a portion of the light bar 320. Alternatively, the protruding part 350 is not in contact with the light source 322 and has a lower surface supported by the back plate 310. In one embodiment, the protruding part 350 is in close contact with the light guide plate 330, the film structure 340, and the light bar 320.

Figure 6:
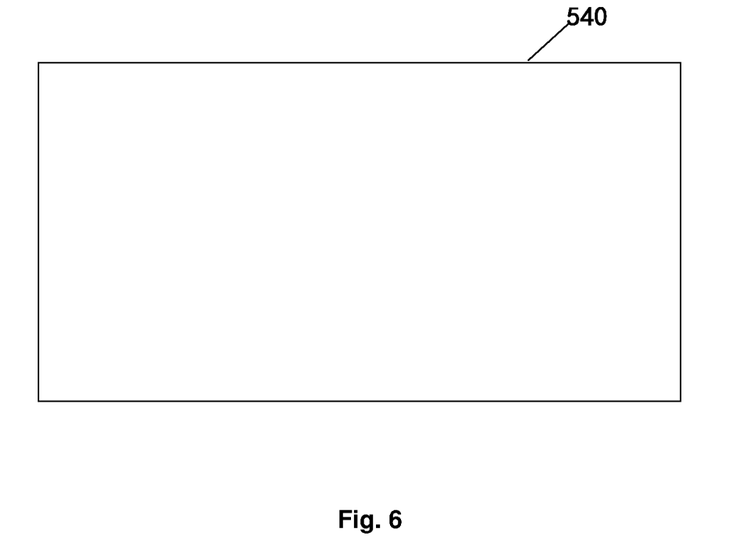
FIG. 6 illustrates an exemplary overall outline view of a film structure in a backlight module according to an embodiment of the present disclosure.

By arranging the protruding part 350 as described above, the film structure 340 needs not to have a shape with protruding portions at opposite ends of the side thereof which is close to the light bar 320. Thereby, the film structure has a regular shape, such as a rectangle 540 as shown in FIG. 6. This means that there will be relatively simple cutting operations when the film structure is manufactured, which greatly improves the cutting efficiency of the film structure. In addition, such a regularly shaped film structure also avoids a waste of the film material, which reduces the production cost.

Further, in some embodiments, the protruding part 350 may have a top portion protruding from the gap, so that the protruding part 350 has a top surface (i.e., the upper surface) higher than the upper surface of the film structure 340 arranged on the light guide plate 330. Further, in some embodiments, the surface of the protruding part 350 which is in contact with the light guide plate 330 and the film structure 340 is processed to increase its friction coefficient. For example, the friction coefficient is increased by roughening the surface of the protruding part 350 which is in contact with the light guide plate 330 and the film structure 340 or by spraying fine particles onto this surface. In other embodiments, one or more micro ribs may further be disposed on a side surface of the portion of the protruding part 350 which is higher than the light guide plate 330 and the film structure 340 (a side surface facing the light guide plate 330 (or the film structure 340) or in contact with the light guide plate 330 (or the film structure 340), to prevent the film structure 340 from being detached.

In one embodiment, the protruding part 350 has a bottom portion disposed on the back plate 310 (or on the reflective plate 360 in the embodiment shown in FIG. 3).

In the present embodiment, by disposing the protruding part and configuring the protruding part to have an upper surface higher than that of the film structure, the film structure may not be detached, which prevents bright lines from appearing on a side opposite to the light bar, thereby ensuring the display quality.

Figure 4:
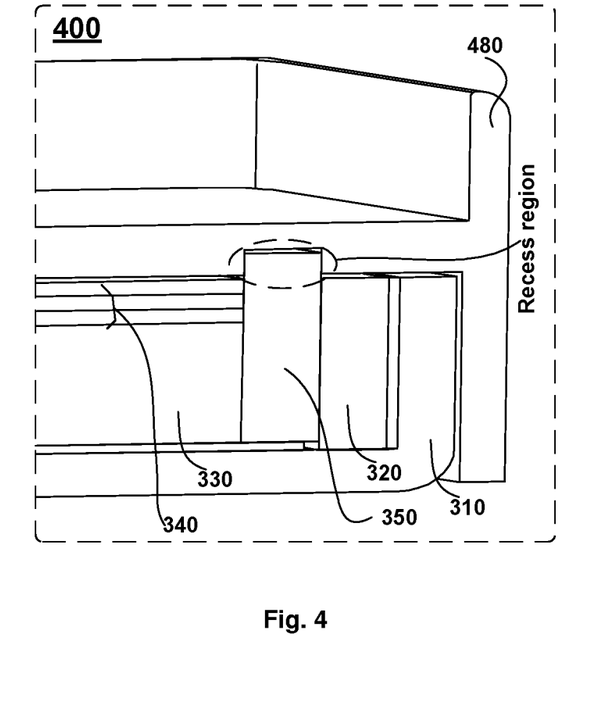
FIG. 4 illustrates an exemplary partial structural view of a backlight module having a plastic frame according to an embodiment of the present disclosure.

FIG. 4 illustrates an exemplary partial structural view of a backlight module 400 having a plastic frame 480 according to still another embodiment of the present disclosure. The backlight module 400 shown in FIG. 4 is different from the backlight module 300 shown in FIG. 3 in that the backlight module 400 further comprises the plastic frame 480 disposed therein. Here, for the sake of brevity, the same components in the backlight module 400 as those in the backlight module 300 will not be described in detail, and these components in the backlight module 400 are still referred to by the reference numerals of the corresponding components in the backlight module 300.

As shown in FIG. 4, the plastic frame 480 is arranged above the film structure 340, the protruding part 350, and the light bar 320. In the embodiment shown in FIG. 4, the plastic frame 480 specifically comprises a plastic frame cover and a plastic frame bezel which is located at an edge of the plastic frame cover and is perpendicular to a surface of the plastic frame cover. The plastic frame cover is located above the bezel of the film structure 340, the protruding part 350, the light bar 320, and the bezel of the back plate 310. The plastic frame bezel closely surrounds the bezel of the back plate 310.

In one embodiment, a recess region which fits the protruding part 350 is formed in the plastic frame 480 (the plastic frame cover). The protruding part 350 has a top portion disposed in the recess region and thereby in close contact with the plastic frame 480.

In one embodiment, the plastic frame 480 is also in close contact with the film structure 340 and the light bar 320. In other embodiments, the plastic frame 480 may not be in contact with at least one of the film structure 340 and the light bar 320.

By disposing the recess region on the plastic frame which fits the protruding part, the possibility that the film structure is detached is completely eliminated, and the movement of the protruding part is avoided, so that the entire structure is more stable.

Figure 5:
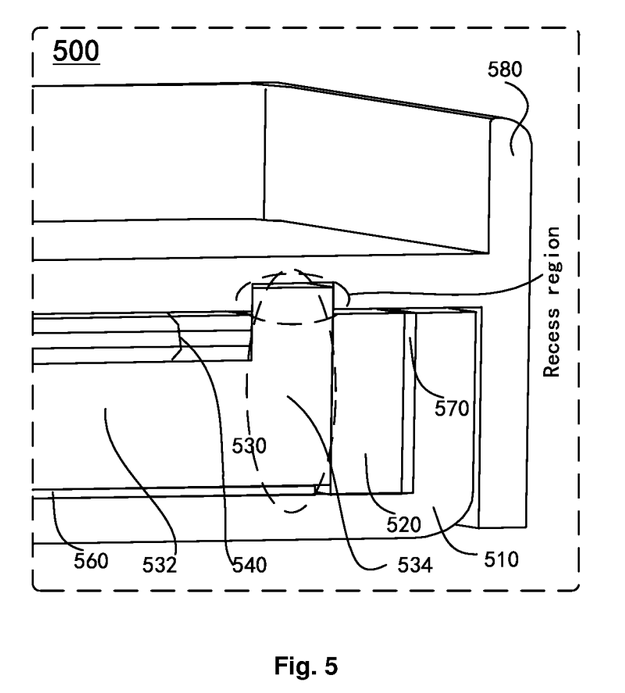
FIG. 5 illustrates an exemplary partial structural view of a backlight module according to another embodiment of the present disclosure.

FIG. 5 illustrates an exemplary partial structural view of a backlight module 500 according to another embodiment of the present disclosure. As shown in FIG. 5, the backlight module 500 comprises a back plate 510, a light bar 520, a light guide plate 530, a film structure 540, and a plastic frame 580. Also, reflective plates 560 and 570 are further shown in the backlight module 500. In other embodiments, the reflective plates 560 and 570 may be omitted in the backlight module 500, and other additional structures (such as light shading plates, etc.) may be added in the backlight module 500 as appropriate.

The back plate 510, the light bar 520, the film structure 540 and the plastic frame 580 in the backlight module 500 correspond to the back plate 310, the light bar 320, the film structure 340 and the plastic frame 480 in the backlight module 400, and will not be described in detail here.

The light guide plate 530 is arranged on the back plate 510 and is closely arranged adjacent to the light bar 520 on the back plate 510.

The light guide plate 530 comprises a plate body portion 532 and a protruding portion 534. In one embodiment, a film structure 540 is disposed on the plate body portion 532. In one embodiment, the plate body portion 532 has an edge flush with that of the film structure 540.

In one embodiment, the light guide plate 530 is arranged on the back plate 510 by arranging both the plate body portion 532 and the protruding part portion 534 on the back plate 510. In another embodiment, the light guide plate 530 may be arranged on the back plate 510 by arranging the plate body portion 532 only on the back plate 510.

The light guide plate 530 is in close contact with the light bar 520 by the protruding part portion 534, and neither the plate body portion 532 nor the protruding part portion 534 are in contact with the light source on the light bar 520.

The protruding part portion 534 protrudes from an upper surface of the plate body portion 532 and is higher than an upper surface of the film structure 540 arranged on the plate body portion 532. Further, in some embodiments, the surface of the protruding part portion 534 which is in contact with the film structure 540 is processed to increase its friction coefficient. For example, the friction coefficient is increased by roughening the surface of the protruding part portion 534 which is in contact with the film structure 540 or by spraying fine particles onto this surface. In other embodiments, one or more micro ribs may further be disposed on a side surface of the portion of the protruding part body 534 which is higher than the film structure 540 (a side surface facing the light guide plate 530 (or the film structure 540) or in contact with the light guide plate 530 (or the film structure 540), to prevent the film structure from being detached.

A recess region which fits the protruding part portion 534 is disposed on the plastic frame 580. The portion of the protruding part portion 534 which protrudes from the upper surface of the film structure 540 is at least partially disposed in the recess region of the plastic frame 580 to be tightly coupled to the plastic frame 580.

In the present embodiment, the light guide plate is configured to have a plate body portion and a protruding portion, and the function of the protruding part in the embodiments shown in FIGS. 3-4 is realized by the protruding portion, that is, in the present embodiment, it is equivalent to integrally form the light guide plate and the protruding part in the backlight module shown in FIGS. 3-4. In the present embodiment, the integrally formed structure is more robust and stable.

FIG. 6 illustrates an overall outline view of a film structure in a backlight module according to an embodiment of the present disclosure.

As described above, it can be seen from FIG. 6 that, in a case of the film structure 540, the film structure in the embodiment of the present disclosure is no longer in a shape with two protruding portions as shown in FIG. 2, and instead has a rectangle shape. This can greatly improve the cutting efficiency of the film structure, and can avoid a waste of the film material, which reduces the production cost.

Figure 7:
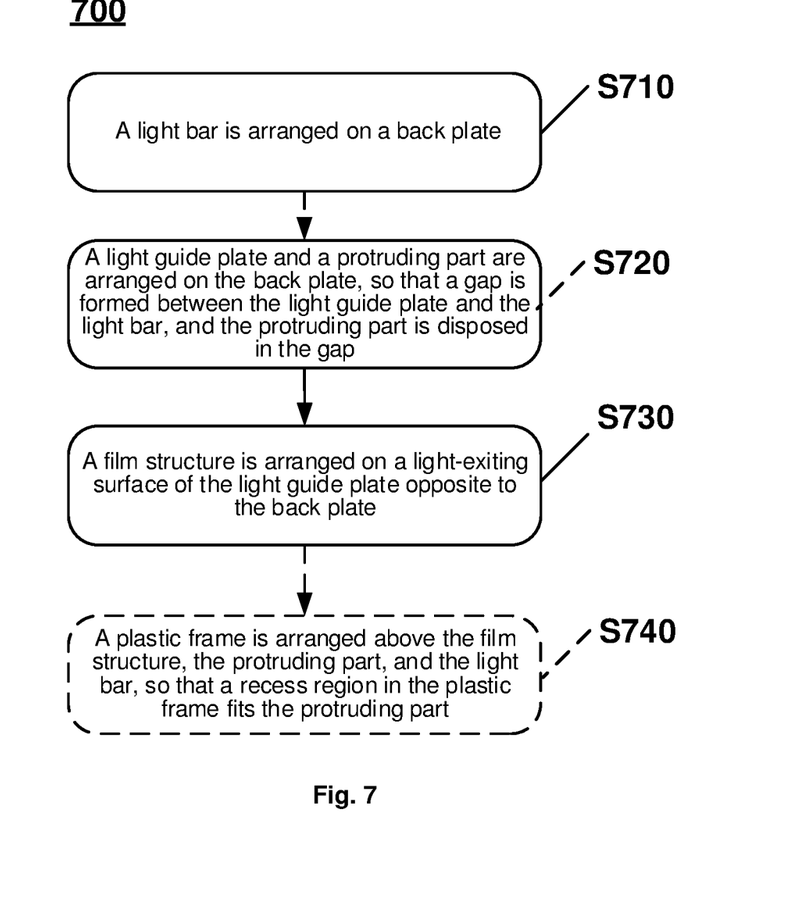
FIG. 7 illustrates an exemplary flowchart of a method for assembling a backlight module according to an embodiment of the present disclosure.

FIG. 7 illustrates a flowchart of a method 700 for assembling a backlight module according to an embodiment of the present disclosure.

As shown in FIG. 7, the method 700 starts at step S710, in which a light bar is arranged on a back plate. Here, a light source is arranged on the light bar.

In one embodiment, the perimeter of the back plate (or at least one side of the back plate on which the light bar is arranged and its opposite side) is bent upward to form a bezel, and the light bar is fixed onto the bezel.

Then, in step S720, a light guide plate and a protruding part are arranged on the back plate, so that a gap is formed between the light guide plate and the light bar, and the protruding part is disposed in the gap.

In one embodiment, the protruding part and the light guide plate are separately formed (corresponding to FIGS. 3-4), and the light guide plate and the protruding part may be separately disposed in step S720. Here, the arrangement order of the protruding part and the light guide plate is not limited, and the light guide plate may be arranged firstly, and then the protruding part may be arranged, or the protruding part may be arranged firstly, and then the light guide plate may be arranged.

In another embodiment, the protruding part and the light guide plate are integrally formed (corresponding to the protruding portion and the plate body portion of the light guide plate in FIG. 5), and then, in step S720, the light guide plate and the protruding part are arranged simultaneously.

In one embodiment, the light source on the light bar is located in the gap.

Finally, in step S730, a film structure is arranged on a light-exiting surface of the light guide plate opposite to the back plate.

Notwithstanding the preceding description, it should be understood that an execution order of the above steps is not limited to the order described in connection with FIG. 7, and the steps may be performed in any reasonable order. For example, in some embodiments, the light guide plate and the film structure may be assembled firstly, and then the assembly of the light guide plate and the film structure is mounted on the back plate. Further, as previously mentioned, the protruding part may be mounted before or after or even at the same time when the assembly of the light guide plate and the film structure is mounted.

In one embodiment, two sides of the protruding part are in close contact with at least a portion of the light guide plate and the film structure and with at least a portion of the light bar, respectively. Also, the protruding part protrudes from the gap, so that the protruding part has an upper surface higher than that of the film structure.

In addition, the method 700 may further comprise the following step 740 of arranging a plastic frame above the film structure, the protruding part, and the light bar, so that a recess region in the plastic frame fits the protruding part. This step may be optional and therefore is shown by a dashed box in FIG. 7.

It should be illustrated that the method 700 for assembling a backlight module corresponds to the backlight modules in FIGS. 3-5, and therefore, the explanations and descriptions made above in connection with FIGS. 3-5 are equally applicable here.

The present disclosure further provides a display panel. The display panel comprises the backlight modules in various embodiments as described above in connection with FIGS. 3-5.

The detailed description above has set forth numerous embodiments by using schematic diagrams, flowcharts and/or examples. In a case where such schematic diagrams, flowcharts, and/or examples comprise one or more functions and/or operations, it should be understood by those skilled in the art that each of the functions and/or operations in such schematic diagrams, flowcharts, or examples may be implemented individually and/or collectively by various structures, hardware, software, firmware or substantially any combination thereof.

Although the present disclosure has been described with reference to a few exemplary embodiments, it is understood that the terms used are illustrative and exemplary and not restrictive. The present disclosure may be embodied in a variety of forms without departing from the spirit or substance of the present disclosure. Therefore, it is to be understood that the embodiments described above are not limited to any detail described above, but are construed broadly within the spirit and scope defined by the appended claims. Accordingly, all changes and modifications which fall within the scope of the claims or the equivalents thereof are intended to be covered by the appended claims.

We claim:

1. A backlight module comprising:
    a back plate;
    a light bar arranged on the back plate;
    a light guide plate arranged on the back plate to form a gap between the light guide plate and the light bar;
    a film structure arranged on a light-exiting surface of the light guide plate opposite to the back plate; and
    a protruding part disposed in the gap, wherein two sides of the protruding part are in contact with at least a portion of the light guide plate and the film structure and with at least a portion of the light bar, respectively,
    wherein a micro rib is disposed on a side of the portion of the protruding part higher than the light guide plate and the film structure, which faces the light guide plate.

2. The backlight module according to claim 1, wherein the protruding part protrudes from the gap, such that the protruding part has an upper surface higher than that of the film structure.

3. The backlight module according to claim 2, further comprising: a plastic frame arranged above a bezel of the film structure, the protruding part, and the light bar.

4. The backlight module according to claim 3, wherein the plastic frame is in close contact with the film structure and the light bar.

5. The backlight module according to claim 3, wherein the plastic frame is not in contact with at least one of the film structure and the light bar.

6. The backlight module according to claim 3, wherein the plastic frame has a recess region formed therein to fit the protruding part.

7. The backlight module according to claim 1, wherein the protruding part and the light guide plate are integrally formed.

8. The backlight module according to claim 1, wherein the periphery of the back plate is bent upward to form a bezel, and the light bar is fixed onto the bezel of the back plate.

9. The backlight module according to claim 1, further comprising: a light source arranged on the light bar and located in the gap.

10. The backlight module according to claim 1, wherein the surface of the protruding part, which is in contact with the light guide plate and/or the film structure, is roughened.

11. The backlight module according to claim 1, wherein the film structure has a rectangle shape.

12. A display panel comprising the backlight module according to claim 1.

13. A method for assembling a backlight module, the method comprising:
    arranging a light bar on a back plate;
    arranging a light guide plate and a protruding part on the back plate, such that a gap is formed between the light guide plate and the light bar, and the protruding part is disposed in the gap; and
    arranging a film structure on a light-exiting surface of the light guide plate opposite to the back plate,
    wherein a micro rib is disposed on a side of the portion of the protruding part higher than the light guide plate and the film structure, which faces the light guide plate.

14. The method according to claim 13, further comprising:
    arranging a plastic frame above the film structure, the protruding part, and the light bar, such that a recess region in the plastic frame fits the protruding part.

15. The method according to claim 13, wherein a light source is arranged on the light bar.

16. The method according to claim 13, wherein at least one side of the back plate is bent upward to form a bezel, and the light bar is fixed onto the bezel.

17. The method according to claim 13, wherein the protruding part and the light guide plate are integrally formed.

18. The method according to claim 13, wherein the protruding part protrudes from the gap, such that the protruding part has an upper surface higher than that of the film structure.

19. The method according to claim 13, wherein two sides of the protruding part are in close contact with at least a portion of the light guide plate and the film structure and with at least a portion of the light bar, respectively.

* * * * *